April 13, 1943. A. J. PATCH 2,316,281
CONSTANT PRESSURE WRINGER
Filed Nov. 24, 1939 8 Sheets-Sheet 1

Fig. 18.

Patented Apr. 13, 1943

2,316,281

UNITED STATES PATENT OFFICE 2,316,281

CONSTANT PRESSSURE WRINGER

Allen J. Patch, Ripon, Wis.

Application November 24, 1939, Serial No. 305,773

4 Claims. (Cl. 68—256)

This invention relates to washing machine wringers and particularly to a new and improved pressure mechanism to apply spring pressure between the wringer rolls.

In the prior art it has been customary to provide springs to urge a pair of wringer rolls into engagement in order to supply sufficient pressure between the rolls to insure effective wringing of the clothes, but the spring structures heretofore used have had certain characteristics which have given rise to serious objections in operation.

In the ordinary wringer construction, the rolls are forced into engagement by one or more springs acting directly upon the rolls or in such a manner that any given amount of displacement of the rolls due to the thickness of materials passing between them results in a corresponding distortion of the pressure springs. The usual types of springs commonly used in wringers follow the physical principle expressed in Hooke's law, namely, that within the elastic limit, the deformation is proportional to the stress.

In a wringer structure this means that the effective pressure between the rolls will increase as the wringer rolls are forced apart by garments passing between them and that this increase of pressure will be directly proportional to the amount of deformation of the wringer springs, since the mechanical advantage effective between the spring structures themselves and the rolls remain constant in the wringers heretofore used.

It is the particular object of this invention to provide a safer or less dangerous wringer by maintaining roll pressures at a fairly constant effective wringing level regardless of the separation of the rolls and deformation of the springs, thus avoiding the dangerous crushing pressures of conventional wringers under accident conditions.

It is, therefore, the principal object of this invention to provide a spring pressure mechanism for wringers whereby the effective operating pressure between the rolls will be disproportionate to the spacing between the rolls or the deformation of the spring, to the end that the effective pressure between the rolls will not be caused to rise to an undesirable and dangerous extreme when the rolls are forcibly separated.

Another object of this invention is to provide a wringer having a variable mechanical advantage between the wringer rolls and the pressure spring, whereby the mechanical advantage of the spring decreases as the spacing between the rolls and the deformation of the spring increases in order to alter the normal rate of pressure increase between the rolls.

A further object of the invention is to provide such a variable mechanical advantage between the wringer rolls and spring that the rolls may be urged into engagement under constant pressure irrespective of the thickness of materials passing between the rolls, or that the rolls may be caused to operate under reduced pressure whenever they are forced apart by unusually thick materials passing between them.

Another important object of the invention is to provide a wringer mechanism including torque springs and means for causing said torque springs to urge a pair of wringer rolls into engagement by movement along a rectilinear path of roll travel, and to provide a new and novel torque spring structure adapted to be used in clothes wringers.

Other objects will appear hereinafter.

In order to provide a spring pressure mechanism wherein the pressure effective between the rolls is disproportionate to the deformation of the spring, we may provide springs so designed that by virtue of their peculiar structure they do not exert pressure in direct relationship with the degree of deformation, or we may utilize standard types of springs provided with spring coupling means adapted to vary the mechanical advantage between the spring and rolls, to reduce the mechanical advantage of the spring as the deformation is increased.

In the present invention the desired objects are accomplished by providing a wringer structure having an upper roll mounted for rotary movement in a fixed position and adapted to be driven by a power head including a pair of reversing gears. A lower wringer roll is journaled in bearings mounted in the slides in such a manner that the lower wringer roll may move in a straight line vertical path whenever the rolls are forced apart or whenever the roll release mechanism is actuated.

The spring structure associated with the lower roll comprises a plurality of torque springs operatively interconnected with the lower roll by means of a plurality of cranks and linkages in such a manner that the mechanical advantage between the torque springs and the roll varies in accordance with the spacing between the rolls and it is in the structure and variation of these elements that the principal novelty of this invention resides. It will be understood that in a conventional wringer structure the arrangement is such that the rolls are urged into engagement under some degree of pressure even when no garments are passing between the rolls, and that as garments are passed between the rolls they will be forced apart and the spring tension effective to apply pressure to the work will vary in accordance with the thickness of the materials between the rolls. Normally, this may be calculated to provide approximately the correct pressure on the work and the operation of such wringers may be entirely satisfactory, but in the event that unusual thicknesses or knotty portions of the clothes are fed between the rolls, the rolls may be forced apart abnormally and the operating pressure will rise far above the maximum desirable limit.

It will be appreciated that if clothes fed into the wringer are sufficiently thick or knotty, the pressure may become so great that the rolls will jam and fail to rotate, if power driven, or they may rotate without feeding the work between the rolls. Obviously if the rolls become jammed, the machine will be damaged; since if no parts of the wringer structure are broken by the power drive of the motor, the motor itself will be stopped and will be burned out. On the other hand, in the event that the rolls continue to rotate without feeding the material between them, the pressure between the rolls and the great friction on the work will tear and damage the garments, or will cause the rubber surface of the rolls to be torn from proper bonding engagement on the roll shaft.

The present invention overcomes these difficulties, since the pressure effective between the rolls does not rise above the normal desirable operating pressure at any time, irrespective of the thickness of the materials passing between the rolls, and for this reason the driving mechanism cannot be jammed and the wringer will successfully feed material of far greater thickness than can be passed between the rolls of the conventional type wringer.

The safety factors of the present invention are most important, for in the event that the operator's hand or arm should come between the rolls and force them apart, the pressure will not be increased. Of course, it is well understood that with the relatively high operating pressures customarily used in present day wringers, even the normal operating pressure may cause some degree of pain and injury to the operator in case that her hand or arm is passed between the rolls, but it should be pointed out that any such injury will be far less serious and comparatively minor with a wringer constructed in accordance with the principles of this invention as compared with any conventional type of wringer now in use, in which the pressure rises to abnormally high extremes which crush tissue and even bones in such an emergency.

Referring now more particularly to the drawings.

Figure 1:
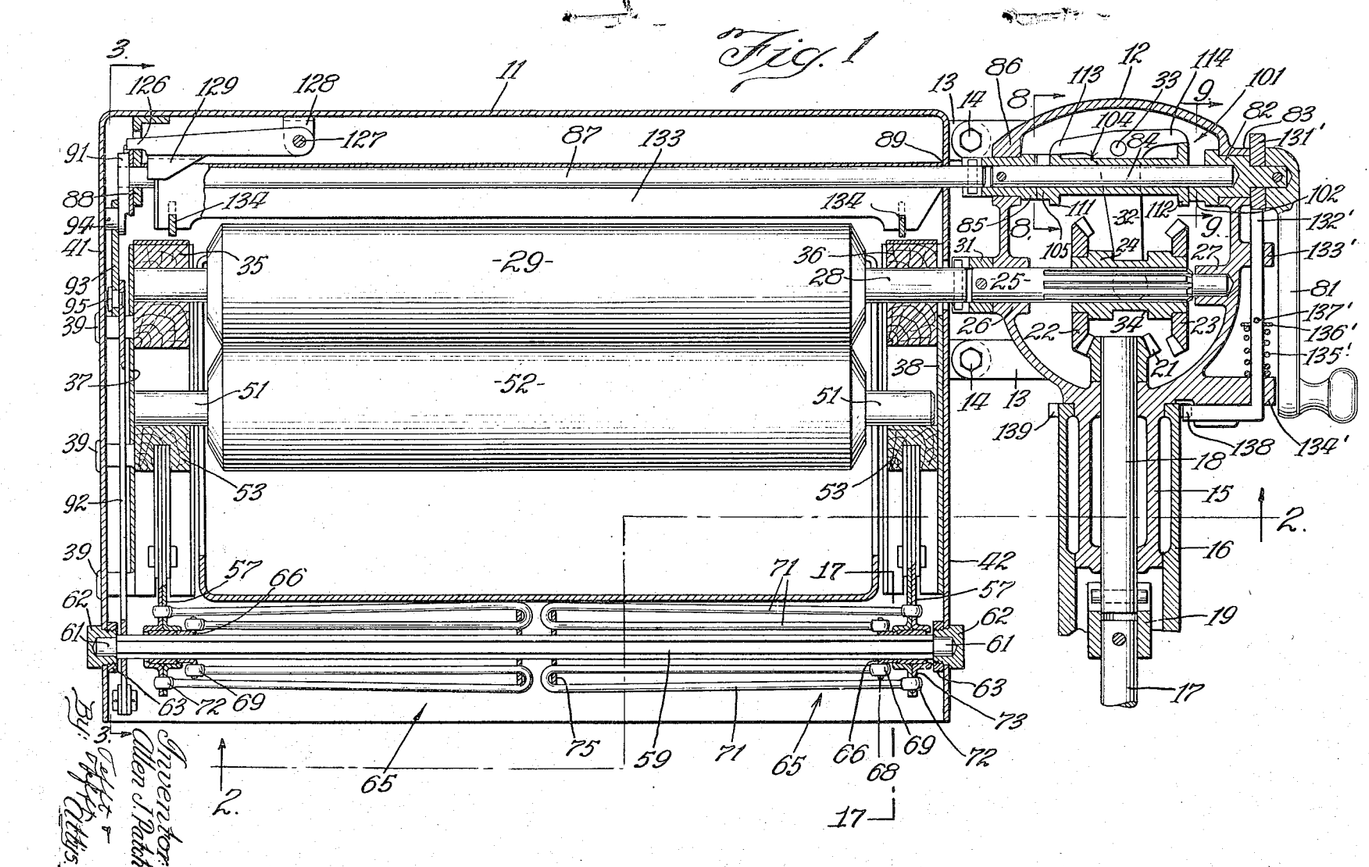
Fig. 1 is a longitudinal sectional view of a wringer structure in accordance with the principles of this invention.

The entire wringer structure is preferably housed in a frame 11 supported on a power head 12 by means of a plurality of brackets 13 and bolts 14. The power head 12 is rotatably mounted upon any suitable structure, as, for example, a washing machine, by means of a downwardly extending sleeve 15 journaled in a supporting sleeve 16 carried by said washing machine (not shown). Ordinarily wringer mechanisms are driven by some electric motor or other power mechanism provided to drive the washing machine and for this purpose a wringer power shaft 17 is coupled to the pinion shaft 18 journaled in the sleeve 15 of the power head 12 by any suitable coupling mechanism, such as the coupling illustrated at 19. The pinion shaft 18 carries a beveled pinion 21 at its uppermost end and a pair of beveled gears 22 and 23 mounted on the sleeve 24 splined to the spline shaft 25 are adapted to engage and be driven by the bevel pinion 21. The splined shaft 25 is journaled for rotation in suitable bearings 26 and 27 formed integrally with the gear head 12 and is coupled to the shaft 28 of the upper wringer roll 29 by means of any suitable coupling 31. The arrangement is such that the bevel gears 22 and 23 carried by the sleeve 24 may be slid along the splined shaft 25 in order that the gear 22 may engage the pinion 21 to drive the wringer roll 29 in a forward direction or the gear 23 may engage the pinion 21 in order to drive the roll 29 in a reverse direction.

The position of these gears is controlled by a bifurcated yoke 32 pivoted on a cross pin 33 and adapted to engage a circumferentially operating groove 34 formed in the sleeve 24. The operating yoke 32 is caused to move between forward, neutral and reverse positions by a cam mechanism to be hereinafter described.

The shaft 28 of the wringer roll 29 is journaled in stationary bearings 35 and 36 secured in the upper ends of a pair of bearing slides 37 and 38 stationarily mounted in a wringer frame 11 by means of a plurality of rivets 39. The rivets 39 are preferably struck from the walls of the bearing slides 37 and 38, but it should be noted that those on slide 37 are of sufficient length that the slide 37 is supported in slight spaced relationship with respect to the end wall 41 of the wringer frame, while the slide 38 is riveted directly against the end wall. This is done in order to accommodate certain operating mechanisms extending between the end wall 41 and the bearing slide 37, which will be described hereinafter.

The shaft 51 of the lower wringer roll 52 is journaled in a pair of bearings 53 mounted for vertical sliding movement in the bearing slides 37 and 38, and each of the bearings 53 carries a pair of pivot pins 54. A link 55 extends from each of the pivot pins 54 to a crank pin 56 on one of the four cranks 57, each of which is rotatably mounted on a sleeve 58 carried by one of a pair of longitudinal extending hexagonal shafts 59. These shafts 59 include a cylindrical bearing portion 61 at each end and the shafts are journaled in bearings 62 secured in the end walls 41 and 42 of the wringer frame by means of the nuts 63.

Figures 2, 16, 17:
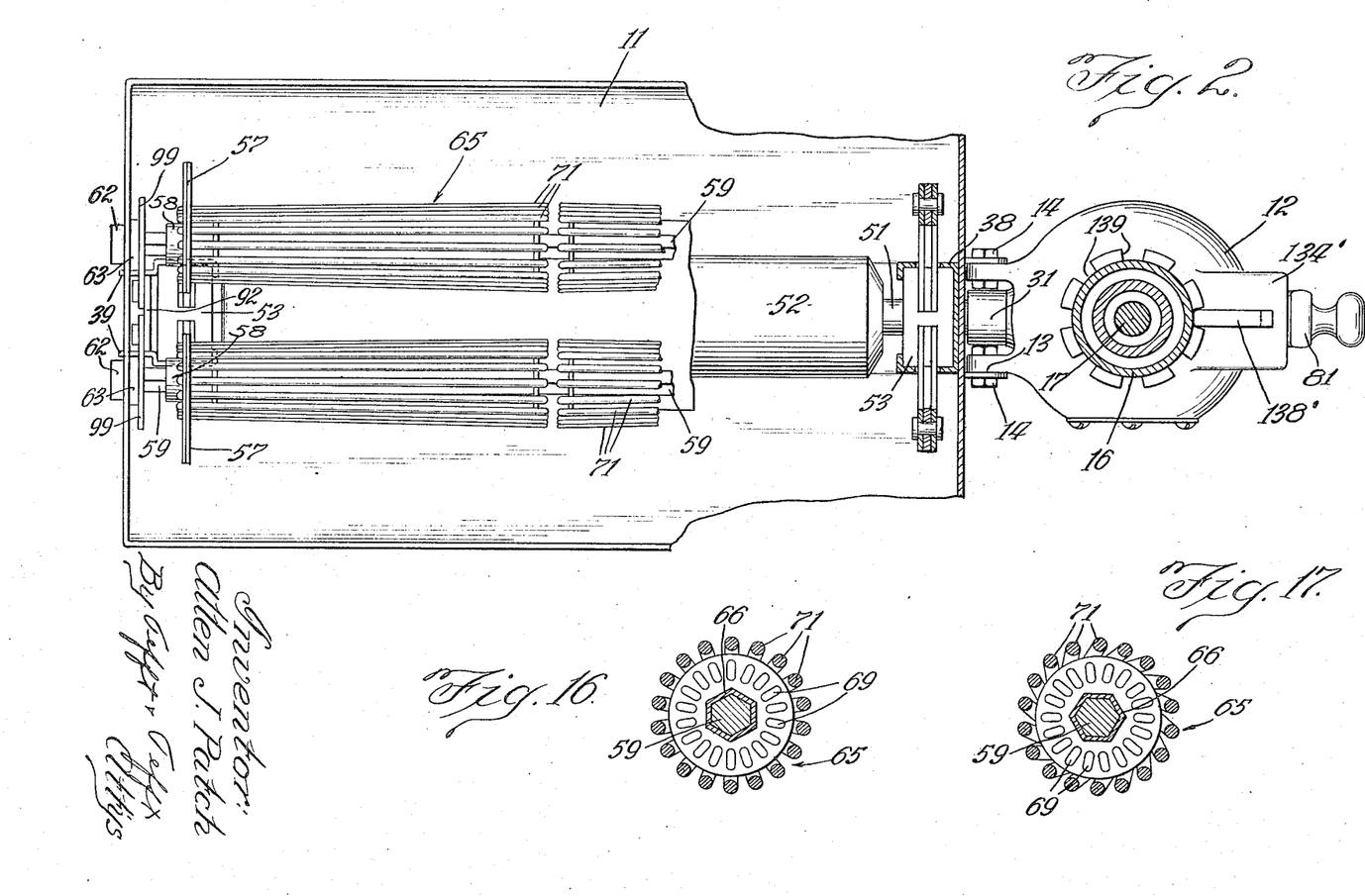
Fig. 2 is a bottom plan view partly in section and is taken substantially on the plane of the line 2—2 in Fig. 1.
Fig. 16 is a detail sectional view of the torque spring assembly and is taken substantially on the plane of the line 16—16 in Fig. 4.
Fig. 17 is a detail sectional view similar to Fig. 16, but showing the assembly in operating position, and is taken substantially on the plane of the line 17—17 of Fig. 1.

Each of the hexagonal shafts 59 serves as a spring anchor shaft for a pair of torque spring structures 65 adapted to exert pressure between the rolls 29 and 52 through the medium of the several cranks 57 and the links 55. A pair of spring anchor flanges 66 are secured to each of the anchor shafts 59 at a point immediately adjoining the position of the sleeves 58, and these anchor flanges secure one end of each of a multiplicity of individual wire spring elements, formed in a general "hair-pin" shape, and mounted in such a position as to extend inwardly parallel to the anchor shaft 59 for about half the length of the shaft and then outwardly to the crank 57. The spring anchor flange 66 is provided with a hexagonal central orifice in such a manner that it will be restrained against rotation on the shaft 59 and is provided with a multiplicity of radial slots 68, each of which receives a flattened end portion 69 of one of the wire spring elements 71. The opposite end of each of the wire spring elements 71 is also flattened as indicated at 72 in order that these portions 72 may be received in the radial slots 73 formed in each of the crank arms 57. Each of the torque spring assemblies 65 is completed by providing a retainer 75 near the center of the shaft 59 in order to retain the numerous individual spring elements 71 in proper clustered relationship.

From the above description, it will be seen that each of the torque spring assemblies 65 comprises a multiplicity of individual wire spring elements 71, each of "hair-pin" configuration, and having one end anchored with respect to the shaft 59 while the other end is anchored to the crank 57. By flattening the end portions 69 and 72 of each of the wire spring elements 71, the spring elements may be clustered closely about the shaft 59, and each of the springs will be restrained against rotation in the orifice formed in the anchor flange 68 or in the crank 57 in such a manner that when the crank 57 is rotated with respect to the shaft 59 and the anchor flange 68, each of the individual spring elements 71 will be subjected to torque and will tend to return the crank 57 to its initial position with respect to the anchor shaft 59.

To establish initial operating pressure between the wringer rolls, a control handle 81 is secured to a sleeve 82 journaled in a suitable bearing portion 83 in the power head 12. The sleeve 82 is drilled to provide a bearing for a shaft 84 pinned to a sleeve 85, which is journaled for rotation in a bearing 86 in the power head 12 and which serves as a coupling between the shaft 84 and a longitudinal control shaft 87 suitably journaled in the wringer frame 11, as shown at 88 and 89. The control shaft 87 carries a crank 91 which is connected to a vertical slide bar 92 by means of a link 93 extending between the crank pin 94 and a pivot pin 95 secured to upper end of the vertical slide bar 92.

Figure 3:
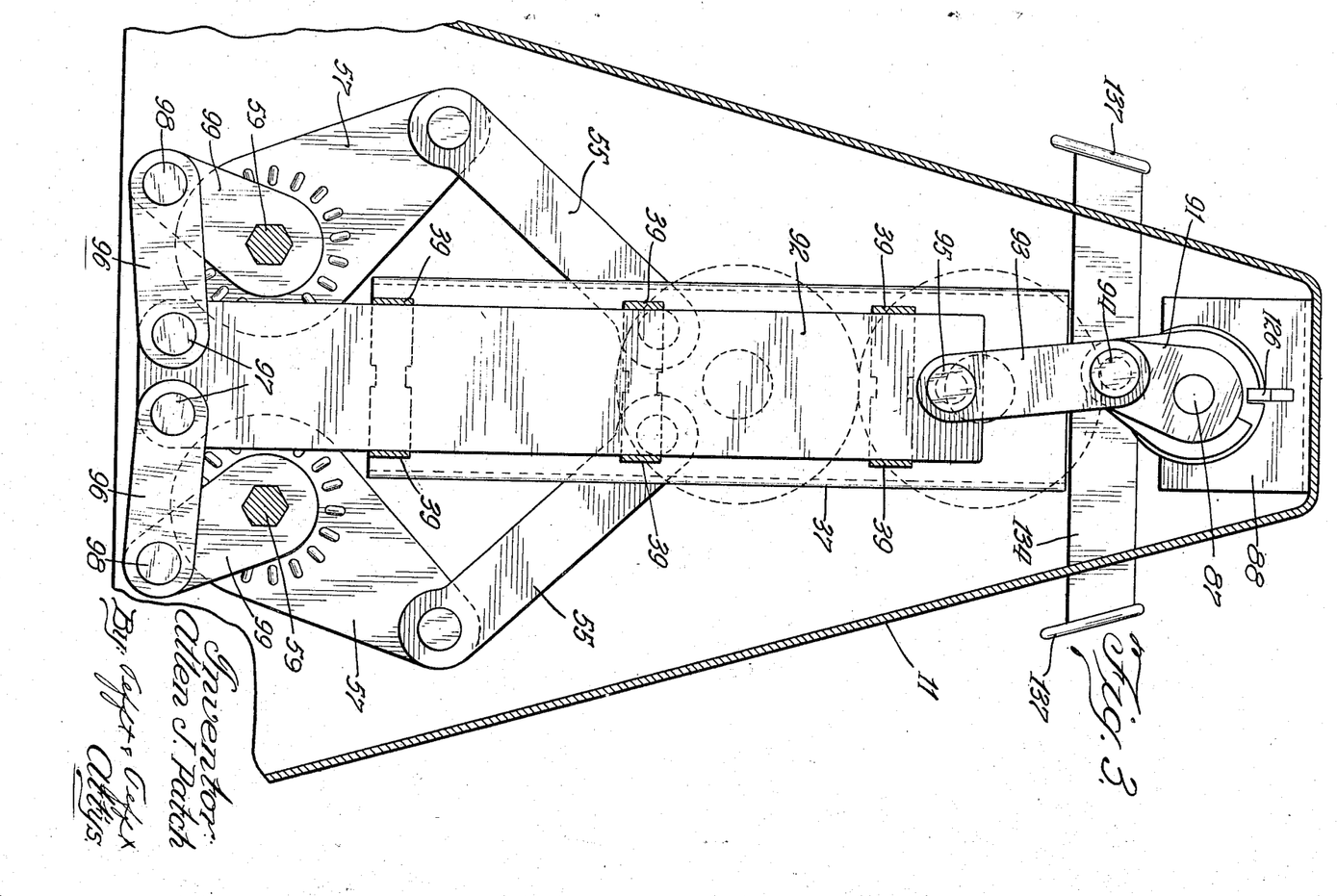
Fig. 3 is a transverse sectional view taken substantially on the plane of the line 3—3 in Fig. 1.
Figure 4:
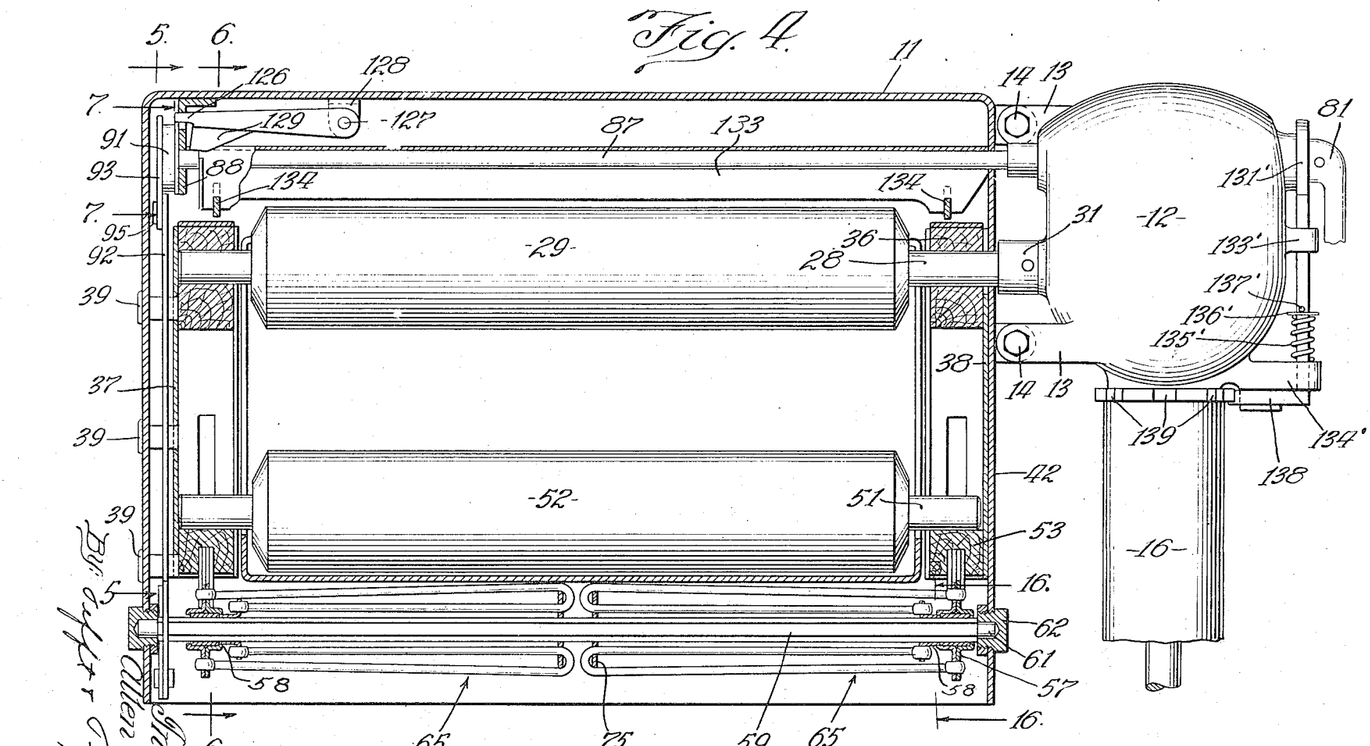
Fig. 4 is a longitudinal sectional view similar to Fig. 1, showing the wringer parts in released position.
Figure 5:
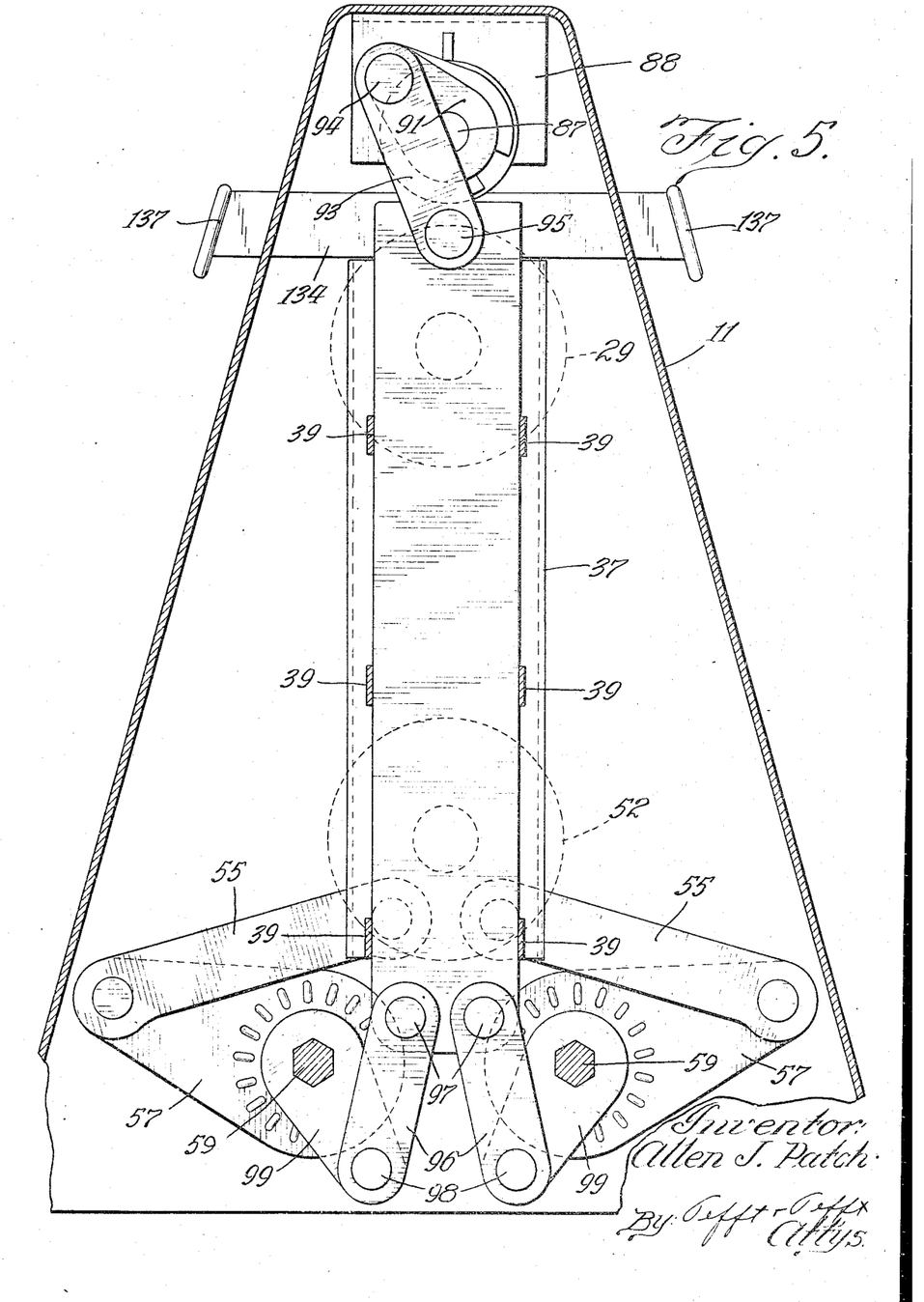
Fig. 5 is a transverse sectional view similar to Fig. 3, showing the several parts of the wringer structure in a released position and is taken substantially on the plane of the line 5—5 in Fig. 4.
Figure 6:
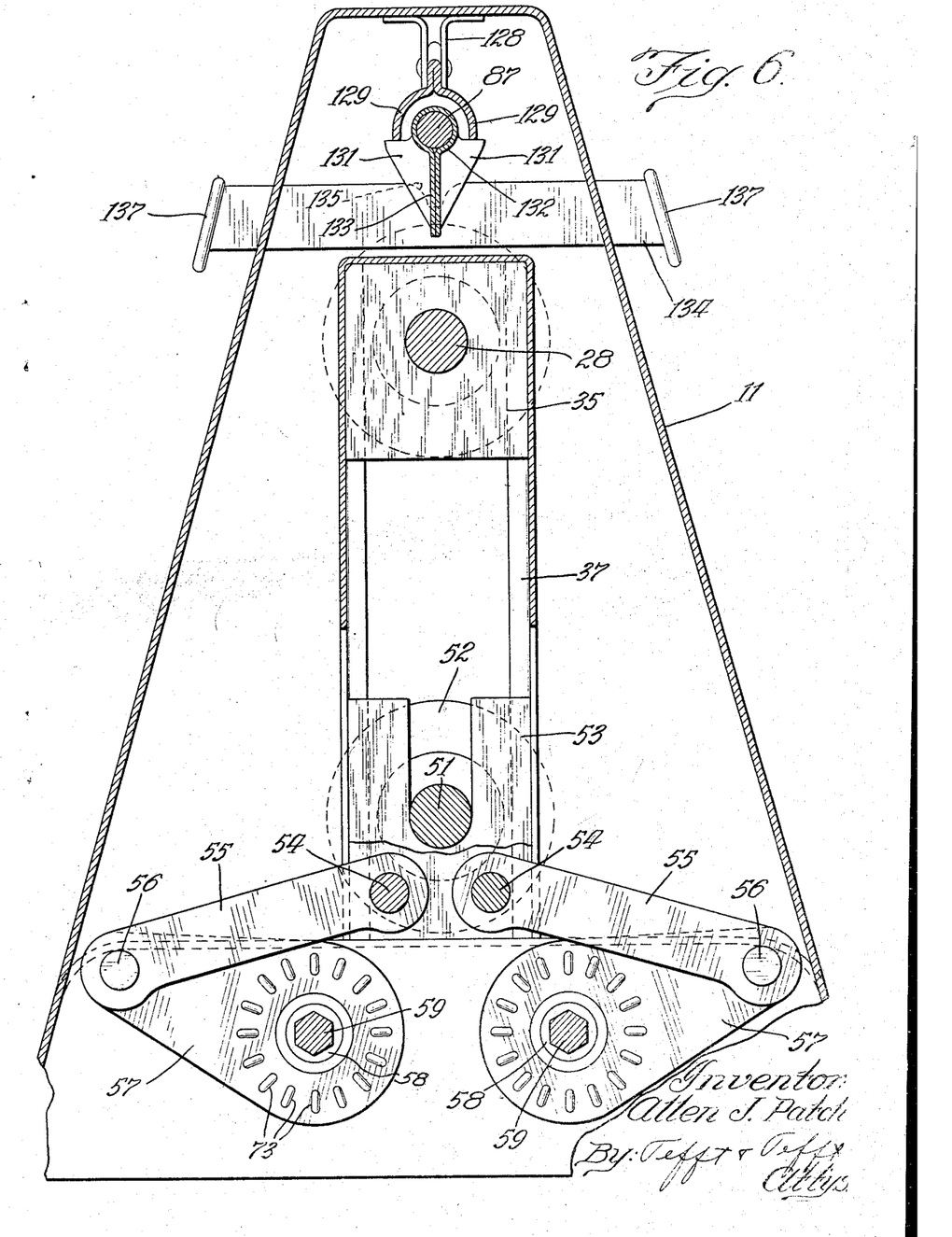
Fig. 6 is a transverse sectional view taken substantially on the plane of the line 6—6 in Fig. 4.
Figure 7:
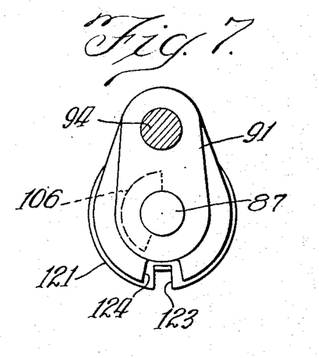
Fig. 7 is a detail sectional view of the pressure reset frame and associated mechanisms taken substantially on the plane of the line 7—7 in Fig. 4 and showing the several parts in released position.
Figure 8:
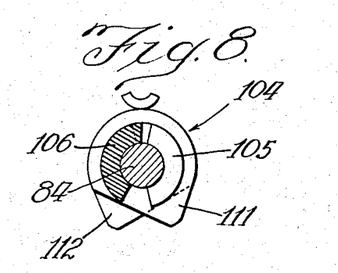
Fig. 8 is a detail sectional view taken substantially on the plane of the line 8—8 in Fig. 1, but showing the several parts in released position.

The vertical slide bar 92 extends downwardly between the bearing slide 37 and the end wall 41 of the wringer frame 11 and is of sufficient width that it is maintained in proper vertical position by the rivet portions 39 struck from the bearing slide 37, as hereinbefore described. The vertical slide bar 92 is operatively connected to each of the hexagonal spring anchor shafts 59 by a pair of links 96 extending between the pins 97 secured to the lower end of the bar 92 and a pair of crank pins 98 carried by the cranks 99 affixed to each of the anchor shafts 58. It will be seen from Fig. 3 that the cranks 99 are provided with hexagonal openings to receive the hexagonal shafts 59 and are, therefore, non-rotatable with respect to these shafts.

One of the objects of this invention is to provide a wringer structure whereby the entire wringer operation may be controlled by a single control handle. To this end a cam assembly 101 is provided within the power head 12 in such a manner that the driving mechanism to the rolls may be controlled simultaneously with the pressure mechanism. The sleeve 82 is provided with an operating segment 102 adapted to move in the path of the operating segment 103 carried at the right-hand end of the cam spool 104 mounted for free rotation on the shaft 84. An operating segment 105 is formed on the left-hand end of the cam spool 104 and is adapted to engage an operating segment 106 formed on the sleeve 85. A pair of operating cams 111 and 112 are formed on the cam spool 104 and are so arranged as to engage the cam rider portions 113 and 114 of the bifurcated operating yoke 34, hereinbefore described, in such a manner that when the control handle 81 is rotated to establish spring pressure between the rolls 29 and 52, the gears 22 and 23 will be automatically operated to drive the wringer in a forward or reverse direction, as desired.

Similarly, when the pressure release mechanism is operated to release the spring pressure from the rolls, these cams will automatically operate to bring the bifurcated yoke 34 to a vertical position such that the gears 22 and 23 will both disengage and stop the rolls from further rotary movement.

Figure 9:
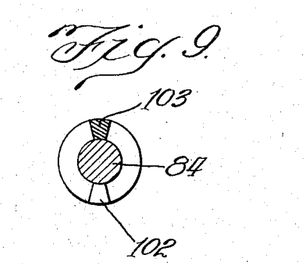
Fig. 9 is a detail sectional view taken substantially on the plane of the line 9—9 in Fig. 1, but showing the several parts in released position.
Figure 12:
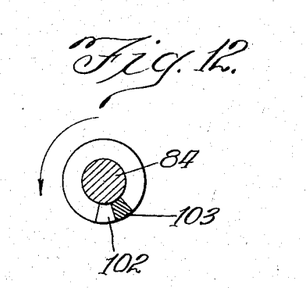

Assuming that the machine is in the released position, illustrated in Figs. 4, 5, 6, 7, 8, and 9, the operator may re-establish spring pressure between the rolls and re-engage driving connection for forward rotation by rotating the operating handle 81 one revolution in a counter-clockwise direction (as viewed in Figs. 9 and 12).

Referring now to Figs. 7 to 12, inclusive, it will be seen that movement of the operating handle 81 through one revolution will first cause the operating segment 102 of the sleeve 82 to engage the operating segment 103 of the cam spool 104 and move this segment 103 from the position illustrated in Fig. 9, to the position illustrated in Fig. 12. This rotation of the cam spool will bring the cam members 111 and 112 to the position shown in Fig. 11 and will raise the cam rider portion 114 and allow the rider portion 113 to move downwardly in such a manner as to rock the yoke 32 about the pin 33 and slide the sleeve 24 longitudinally along the splined shaft 25 sufficiently to cause the bevel gear 22 to engage the bevel pinion 21 (as illustrated in Fig. 1). This movement will cause the driving connection between the power shaft 17 and the wringer rolls to be established to drive the rolls in a forward direction; at the same time the rotation of the cam spool 104 will cause the operating segment 105 affixed to the cam spool to move from the position illustrated in Fig. 8 to the position illustrated in Fig. 11, and this movement of the operating segment 105 will cause it to engage the operating segment 106 on the sleeve 85 and move the pressure crank 91 from the position illustrated in Fig. 7, to the position illustrated in Fig. 10.

Figure 10:
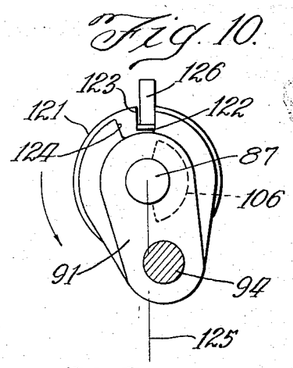
Figs. 10, 11 and 12 are sectional views corresponding to Figs. 7, 8 and 9, respectively, showing the several parts of the mechanism in forward operating position.
Figure 11:
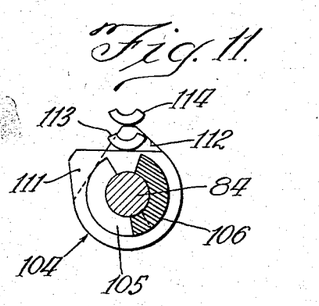

As the crank 91 rotates in a counter-clockwise direction the latch control washer 121 will be caused to rotate since the lug 122 adjacent the notch 123 in the latch control washer is folded outwardly to engage the notch 124 in the crank 91. It will be seen from examination of Fig. 10 that the notch 124 in the crank 91 is somewhat wider than the lug 122 or the notch 123. For this reason when the crank 91 is rotated there will be a certain degree of lost motion between the crank 91 and the latch control washer 121 and this lost motion will be sufficient so that the crank pin 94 must cross the vertical center line 125 before the latch 126 drops into engagement with the notches 123 and 124.

When the latch 126 engages the notch 124, the control handle 81 will hang downwardly in idle position, since the force acting upwardly on the vertical slide bar 92 by virtue of the torque springs 65 will be prevented from rotating the crank 91 by the latch 126.

The latch 126 is pivotally mounted on a rivet 127 mounted in a bracket 128 secured in any suitable manner to the wringer frame 11, and is provided with a pair of release triggers 129, each of which extends somewhat arcuately around the operating shaft 87 in such a manner as to engage an end flange 131 formed on a sleeve 132 which surrounds the operating shaft 87. The sleeve 132 includes a downwardly extending trip flange 133 extending the entire length of the upper roll 29 and in close proximity with the top surface of this roll. At each end of the flange 133 a transverse slide bar 134 is mounted in the wringer frame 11 and notches 135 are provided in each of the slide bars 134 to operatively engage the free end of the flange 133. A pair of manually operable release bars 137 are carried on the transverse slide bars 134 in order that the pressure between the wringer rolls may be instantly released by manual actuation of either of the release bars 137.

In the event that either of the release bars 137 is actuated, the sliding movement of the slide bars 134 will rock the sleeve 132 arcuately about the shaft 87, and one of the end flanges 131 of the sleeve will move upwardly to engage one of the trigger portions 129 of the latch member 126 and thus move the latch member 126 upwardly out of the notch 124 to release the crank 91. When thus released, the crank 91 will rotate in a counter-clockwise direction under the influence of the four torque spring assemblies 65, the force of which is transmitted to the crank 91 by means of the crank 99, the links 96, the vertical slide bar 92 and the link 93. It should be noted, however, that since the crank pin 94 was moved across the center line 125 during the wringer resetting operation, the releasing movement of the crank will impart no motion whatever to the arm 81, since the operating segments 102 and 103 move away from each other, and sufficient lost motion is provided between the operating segments 105 and 106 and the operating segments 102 and 103, that the crank 91 may move from the position shown in Fig. 10 to the position shown in Fig. 7, without causing the operating segments 102 and 103 to engage. Obviously, when the crank 91 reaches the extreme vertical position illustrated in Fig. 7, it is in a dead-center relationship with regard to the vertical slide bar 92, and the crank 91 will not move substantially beyond this dead-center position.

The trip flange 133 heretofore described serves as an automatic pressure release device, and will operate to release the latch 126 in the event that a garment winds around the upper roll 29 instead of feeding through the machine in proper manner. In this event, the garment passing over the top of the roll will engage the flange 133 and will rock the sleeve 132 sufficiently to cause one of the end flanges 131 to bear against the corresponding release trigger 129 and thus release the latch 126.

Figure 13:
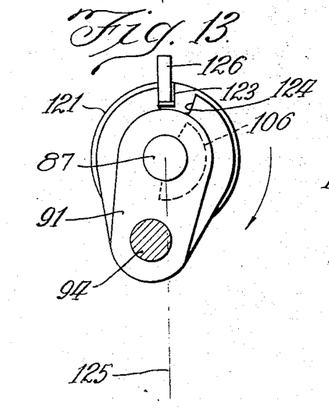
Figs. 13, 14 and 15 are sectional views corresponding to Figs. 7, 8, and 9, respectively, showing the several parts in reversed operating position.
Figure 14:
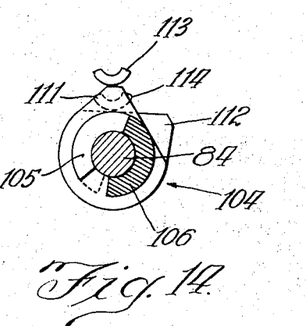
Figure 15:
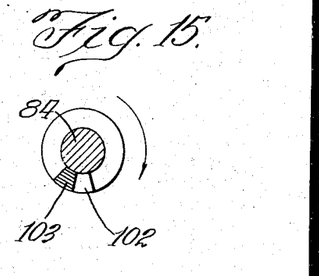

To operate the machine in reverse direction, the operator will rotate the arm 81 one revolution in a clockwise direction, as viewed in Fig. 15. As this is done, the operating segment 102 will again engage the operating segment 103 and will now move this segment 103, the cam spool 104, the cams 111 and 112, and the operating segment 105 to the position illustrated in Fig. 14. The changed position of the cams 111 and 112 will now shift the bifurcated yoke 32 in such a manner as to cause the bevel gear 22 to disengage the bevel pinion 21 and cause the bevel gear 23 to engage the pinion 21 and establish the reverse drive to the wringer rolls. The movement of the operating segment 105 will also engage the operating segment 106 and rotate the crank and arm 91 in a clockwise direction, as viewed in Fig. 13, until the crank pin 94 crosses the vertical center line 125.

From the above description, it will be seen that the forward and reverse operations of the device are substantially identical and that the single control arm 81 automatically controls both the pressure resetting mechanism and the roll drive reversing mechanism. The arm 81 is also provided with means to control the indexing mechanism, whereby the wringer may be secured in any one of several positions about the sleeve 16. To accomplish this desirable result, a cam 131' is secured in position on the sleeve 82 and is adapted to operate against an indexing slide 132' slidably mounted in projections 133' and 134' in the power head 12. A compression spring 135' is mounted on the indexing slide 132' and acts upwardly against a washer 136' secured to the slide 132' by means of a cotter pin 137', in order to urge the slide 132' upwardly so that the latch portion 138 of the slide will engage one of the several notches 139 at the upper extremity of the sleeve 16. The arrangement is such that the latch portion 138 will engage one of the notches 139 and lock the entire wringer structure against rotation with respect to the sleeve 16 at all times during the normal operation of the device. However, whenever the arm 81 is moved from the inoperative position, shown in the drawings, the cam 131' will act to move the indexing slide 132' downwardly and disengage the latch 138 to permit the wringer to be manually rotated about the axis of the sleeve 16 to any desired position.

Figure 18:
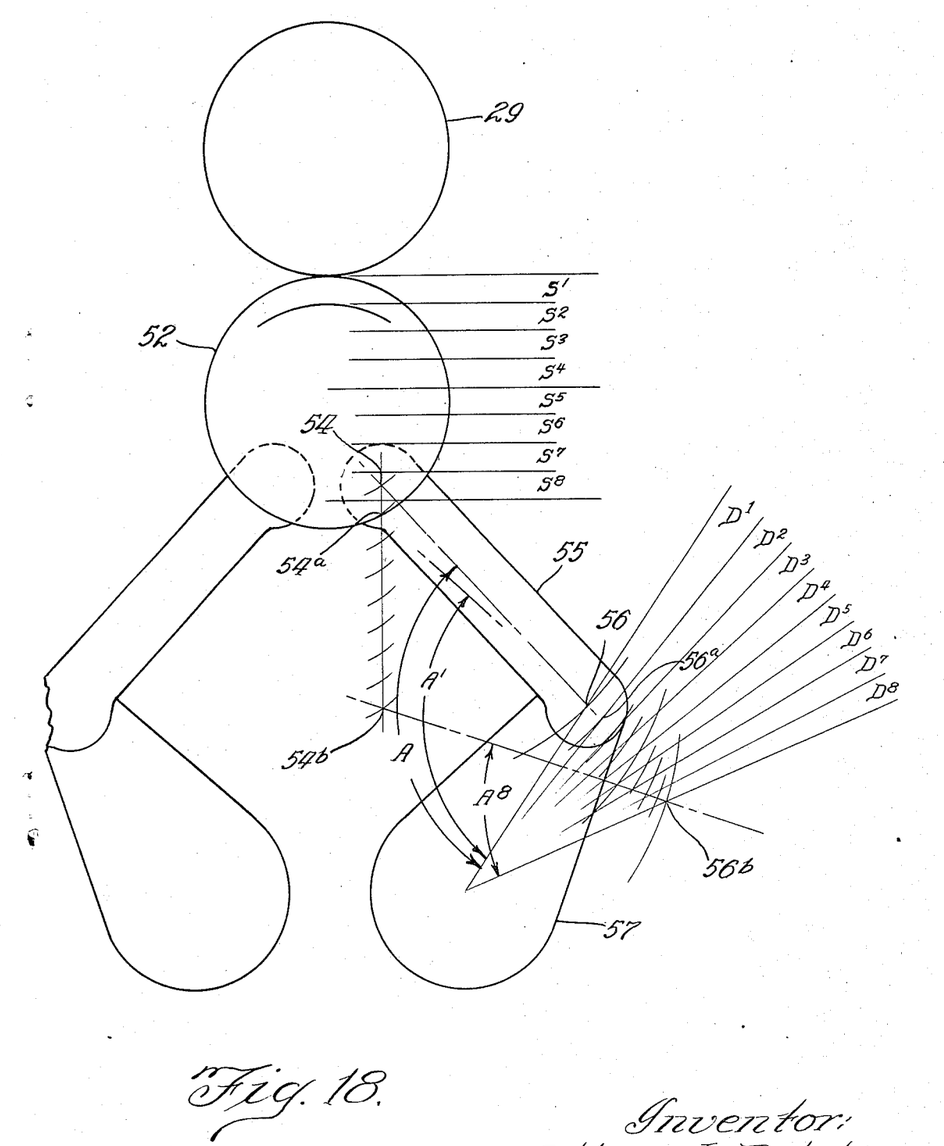
Fig. 18 is a diagrammatic view of the pressure spring means.

The operation of the spring mechanism of the wringer will be best understood by reference to Fig. 18, which is a diagrammatic illustration of the wringer rolls and the spring coupling devices. In this figure, the mechanisms are illustrated in the positions they assume when the rolls 29 and 52 are in their position of minimum spaced relationship; that is, when they are in actual surface contact with each other.

When materials of various thicknesses are passed between the rolls, however, the roll 52 will be forced downwardly against the resistance of the pressure springs 65, which are operatively connected with the cranks 57. For example, when materials of approximately one-quarter inch in thickness are passed between the rolls, the roll 52 will move downward into spaced relationship indicated by the reference numeral $S^1$ on the drawings. As this occurs, the link 55 will rotate the crank 57 a distance sufficient to deform the spring 65 a given amount, indicated on the drawings by the reference numeral $D^1$. The introduction of greater thicknesses of goods between the rolls will result in moving the roll 52 an additional space represented by $S^2$, which will in turn cause the springs 65 to be deformed an amount indicated by the reference character $D^2$.

It should be particularly noted, however, that when the rolls 29 and 52 are in engagement with each other the links 55 and cranks 57 lie in an angular relationship to each other represented by the angle A in the drawings, while when the rolls have been forced apart to the spacing $S^1$ the links 55 and the cranks 57 have moved into a more acute angular position indicated by the angle $A^1$ in the drawings. It will be obvious that as this angle becomes more acute the mechanical advantage of the springs 65 against the roll 52 will be correspondingly decreased, and that as the spacing between the rolls increases in equal units indicated by the reference characters $S^1$, $S^2$, $S^3$, $S^4$, $S^5$, $S^6$, $S^7$, and $S^8$, the angle A will become progressively more acute. The angle $A^8$ in the drawings indicates the angular position assumed by the links 55 and cranks 57 when the roll 55 has been moved downwardly into spaced relationship indicated by the reference numeral $S^8$.

The above examples are intended to illustrate that the mechanical advantage of the springs 65 over the roll 52 is a variable factor, and will become less and less as the spacing between the rolls is increased. The result of this variation is that the deformation of the springs 65 will be disproportionate to the spacing of the rolls, as contrasted to being in direct proportion to the spacing as in wringers commonly known in the art. That is, as the roll 52 is moved downwardly through the several equal units of space represented by numerals $S^1$ to $S^8$ inclusive, the springs 65 will be deformed in unequal amounts, as indicated by the numerals $D^1$ to $D^8$ inclusive. In a structure constructed according to the dimensions shown in the drawings, the mechanical advantage of the linkage varies so that the deformation of the springs 65 is progressively less for each unit of movement of the roll 52, with the net result that the operating pressure effective between the roll 29 and the roll 52 is substantially constant irrespective of the spacing.

As heretofore pointed out, this results in a wringer of high efficiency and safety, possessing numerous advantages not known or used in the prior art.

From the foregoing description it will be apparent that the structure illustrated successfully accomplishes the objects of this invention, since it provides a wringer structure wherein a single control handle is effective to control the wringer indexing mechanism, the pressure resetting mechanism, and the forward or reverse engagement of the roll driving means. Also, as hereinbefore pointed out, the particular spring structure and the spring coupling means for applying the pressure of the spring between the wringer rolls possess great advantages due to the fact that the pressure between the rolls may be maintained at a substantial constant predetermined pressure irrespective of the axial spacing between the rolls or of the thickness of materials being passed through the wringer.

While I have shown and described a present preferred embodiment of this invention, it is subject to numerous variations and modifications and should not, therefore, be limited except as by the scope of the appended claims.

I claim:

1. In a clothes wringer including a frame, a plurality of pressure rolls, roll supporting means adapted to permit said pressure rolls to move relatively to each other to assume a multiplicity of positions in variable spaced relationship with each other, bearing members for said rolls to permit rotary movement of said rolls, and driving means whereby said rotary movement may be imparted to said rolls; the combination of torque spring means comprising a shaft parallel with the rolls in operative non-wringing position, and springs each of which has one end thereof fixed to the shaft and another end thereof attached rotatably for rotation about the shaft in a plane at right angles to the shaft, and spring coupling means connected with the last-mentioned ends of said springs for applying spring pressure therefrom to the end portions of one of said pressure rolls comprising a crank and linkage whereby the torque exerted by said springs is resolved into a force acting in a rectilinear direction to urge said pressure rolls into engagement, and whereby the effective mechanical advantage of the springs decreases as the deformation of the springs increases.

2. In a clothes wringer including a frame, a plurality of pressure rolls, roll supporting means adapted to permit said pressure rolls to move relatively to each other to assume a multiplicity of positions in variable spaced relationship with each other, bearing members for said rolls to permit rotary movement of said rolls, and driving means whereby said rotary movement may be imparted to said rolls; the combination of a torque spring assembly comprising a spring anchor, a plurality of torque spring elements secured to said anchor in radial arrangement and being formed in a U-shape such that each of the individual spring elements will extend longitudinally of said anchor axis, curve outwardly and extend back parallel to said axis in such a manner that the outer ends of said spring elements assume radial positions about the anchor axis, a torque member securing the outer ends of each of said spring elements and being mounted for rotary movement with respect to the spring anchor, and spring coupling means for applying spring pressure to said pressure rolls by connection to the end portions of one of the moving rolls, whereby the torque exerted by said spring elements is resolved into a force acting in a rectilinear direction to urge said pressure rolls into engagement, and whereby the effective mechanical advantage of the spring elements decreases as the deformation of the spring elements increases.

3. In a clothes wringer including a frame, a plurality of pressure rolls, roll supporting means adapted to permit said pressure rolls to move relatively to each other to assume a multiplicity of positions in variable spaced relationship with each other, bearing members for said rolls to permit rotary movement of said rolls, and driving means whereby said rotary movement may be imparted to said rolls; the combination of spring pressure means adapted to maintain operating pressure between said rolls, pressure release mechanism including a manually operable latch for maintaining the spring in operating position, and an arresting means including a crank adapted to assume a dead-center position to limit the movement of the spring and associated parts of the machine when said pressure release is operated.

4. In a clothes wringer, a frame, a stationary top roll mounted in the frame, power means to drive said roll, a lower roll movable downwardly with respect to the top roll, torque spring means comprising a shaft parallel with the rolls in operative non-wringing position, and springs each of which has one end thereof fixed to the shaft and another end thereof attached rotatably for rotation about the shaft in a plane at right angles to the shaft for urging the lower roll into pressure relationship with the top roll, and lever and link means for transmitting the spring pressure from the last-mentioned ends of said springs to said lower roll, the arrangement providing reduced mechanical advantage as the lower roll is moved downwardly and the torque of the spring increased.

ALLEN J. PATCH.